June 16, 1942. J. G. HOLMSTROM 2,286,416
CANE TRUCK
Filed Dec. 18, 1939 4 Sheets-Sheet 3

INVENTOR
John G. Holmstrom
BY
ATTORNEY

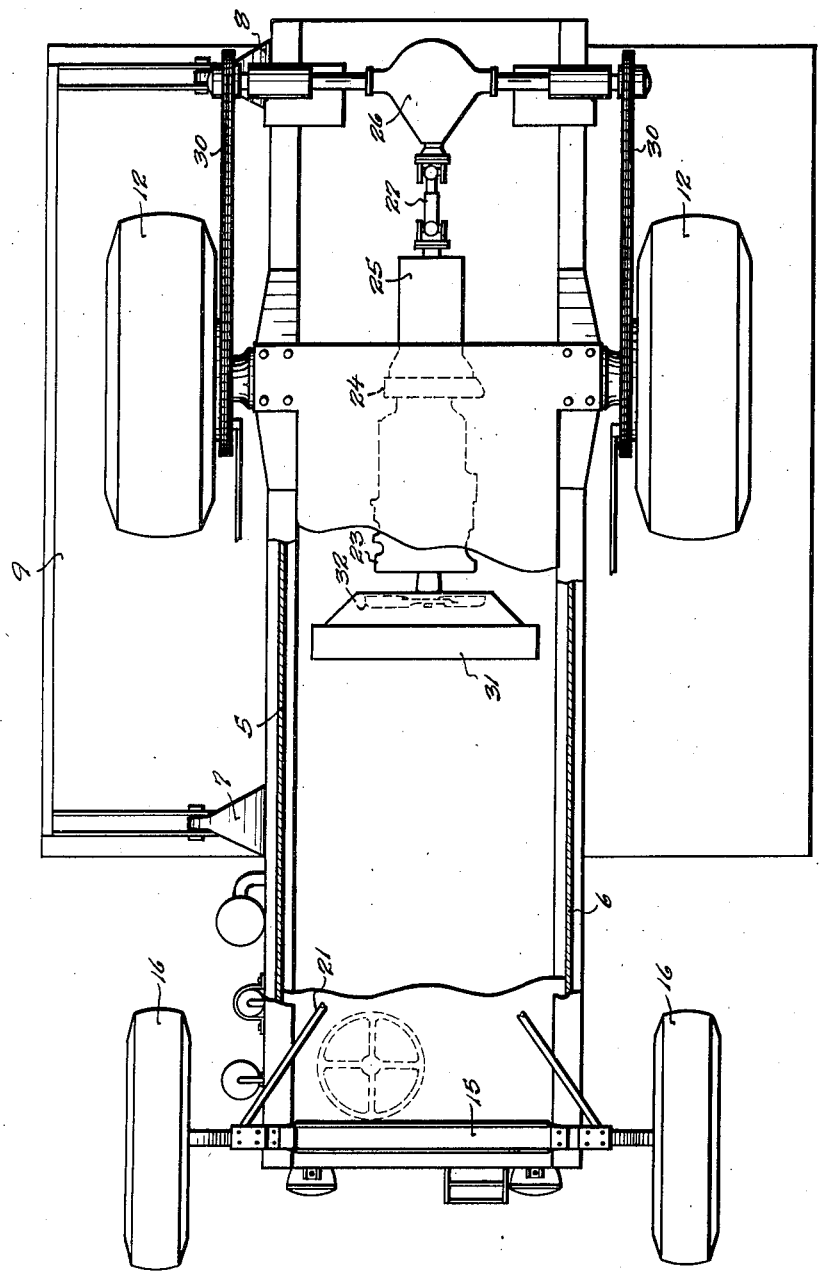

Patented June 16, 1942

2,286,416

UNITED STATES PATENT OFFICE 2,286,416

CANE TRUCK

John G. Holmstrom, Seattle, Wash., assignor to Kenworth Motor Truck Corporation, Seattle, Wash., a corporation of Washington Application December 18, 1939, Serial No. 309,839

10 Claims. (Cl. 180—54)

This invention relates to a cane truck for use in hauling cane and, of course, any other like or suitable work in which the difficulties to be surmounted are similar to those encountered in the harvesting of cane. The general object of my invention is to provide a truck capable of most efficiently performing the work, on a sugar plantation, of hauling sugar cane through the fields from the loader to a railroad artery and, to accomplish this general object, has certain other and more particular objects and advantages which will be best understood by outlining, in a preliminary way, the characterizing features and parts of my truck as they are functionally related to the work, in other words by showing the specific office which each such part must desirably, if not necessarily, perform to assure efficiency in the handling of the cane.

It should be here stated, for clarity, that my truck is intended to be employed on those sugar plantations which have a main-line railroad running over the estate and in which, heretofore, portable track has been laid from the main line into the fields for harvesting the crop. It is one of my objective aims to provide a truck which can be shuttled back and forth between the field loader and the main line of the railroad to thereby dispense with the portable track, such being a nuisance to move from one to another field as the harvesting proceeds and being especially disadvantageous from the standpoint of maintenance cost due to the punishment which the track is subjected to by present loading methods—namely mechanical rather than the previous hand loading—as well as from the fact of being laid over uneven ground, proper bedding being impractical due to the relatively short period of time in which the track is left in one location.

In producing my truck body, I engineer the same to a volumetric capacity corresponding to that of a cane car and dump the same sideways, this side dumping, through the act of bulldozing a ramp of dirt alongside the main line of the railroad, permitting the truck to pull onto the ramp and, lying above the cane car, dump directly into the latter, whereupon the truck proceeds down the other side of the ramp with an elimination of any need for backing and horsing the truck into dumping position. While this side dumping assists greatly in completing the function of the truck with a minimum of labor it will be apparent that a side dump is not an essential feature. A stationary hoist, for example, may be used in transferring the load to the cane car.

Foremost among the problems to be met in the operation of a truck over the cane fields is that of traction and, while the problem can be met by an all-wheel drive, it is by reason of the complications, cost, and added weight of a truck so powered that I have devised, for my truck, a system of driving through the rear wheels only which finds its efficiency from the fact of redistributing the truck weight, predicated upon a recognition of traction ability being proportionate to the amount of a vehicle's gross weight resting on the driven wheels. I locate the weight center as near the rear or driven wheels as is practical, and to further the traction employ an extremely broad tire of very large diameter— 18.00 x 24.00 standard lug type—to obtain the best possible contact, considered both longitudinally and transversely, between the tire and the ground.

To further consider the traction characteristic of a truck in what may be referred to as "soft footing," the front wheels, whether driven or not, tend to dig in with a resultant high rolling resistance. The fact of my truck, through its weight distribution, being extremely light in the front end necessarily reduces this tendency and I further minimize the same by using relatively large tires of low-inflation pressure—11.25 x 24.00 with 12 lbs. per sq. in. pressure—for the front wheels and, of more import, employ an advanced spring suspension the action of which maintains the effective wheel weight relatively constant irrespective of the individual springing of the two wheels. The construction, more especially, is such as to eliminate the normal tendency of a deflected wheel to dig into the ground by reason of being spring-loaded relatively in proportion to the degree to which the wheel rises against the resistance of the spring, and essentially consists in a cross-spring supplemented by a wishbone arrangement, the cross-spring being center-pivoted and having its two ends bearing against but slidable transversely over the front axle, the front axle being restrained by the wishbone strut. The arrangement is, in effect, one which, with the mountings for the rear wheels, provides a three-point suspension for the vehicle frame.

It is of course desirable that the vehicle be given maximum traction empty as well as loaded and I have therefore endeavored, within practical limits, to have substantially the same percentage of the vehicle's weight rest on the driving rear wheels when empty as when loaded. To accomplish this objective the relatively heavy mechanical parts, namely the engine, clutch, transmission, and connection from the latter to the driving rear wheels, are grouped in the rear end of the truck with their collective weight centering at or about the axial line of the driving wheels. In so doing, however, it is necessary that provision be made to overcome the very major problem of dust and a particular object of my invention is, therefore, to provide a motor compartment at the rear end of the truck shielded against dust but so arranged in relation to a screened opening at the front end of the vehicle as to assure a clean supply of air not only for combustion purposes but for cooling the radiator of the motor.

Having these foregoing objects in mind and believing that the somewhat cursory reference to the arrangement of the parts will tend to a clearer understanding of the following detailed description, the invention consists in the novel construction and in the adaptation and combination of parts illustrated in the drawings and hereinafter described and claimed.

In said drawings:

Fig. 4 is an underside plan view, partly in section, the section being taken substantially on the median line of the frame channels.

Figure 1:
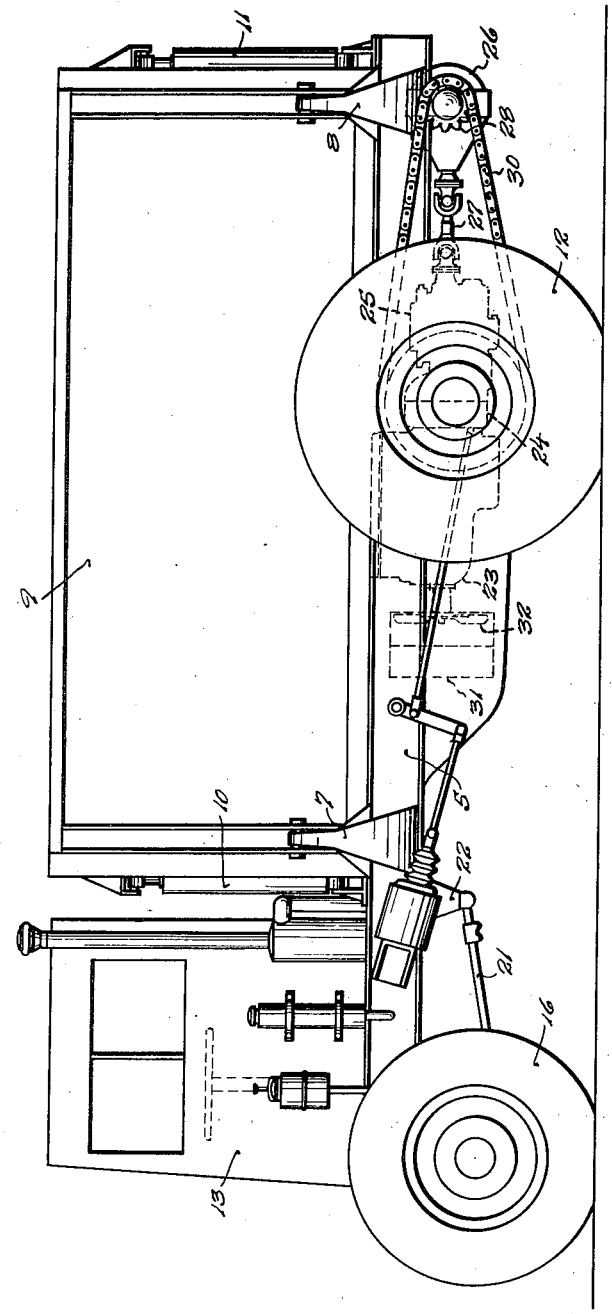
Figure 1 is a side elevational view of the truck.
Figure 2:
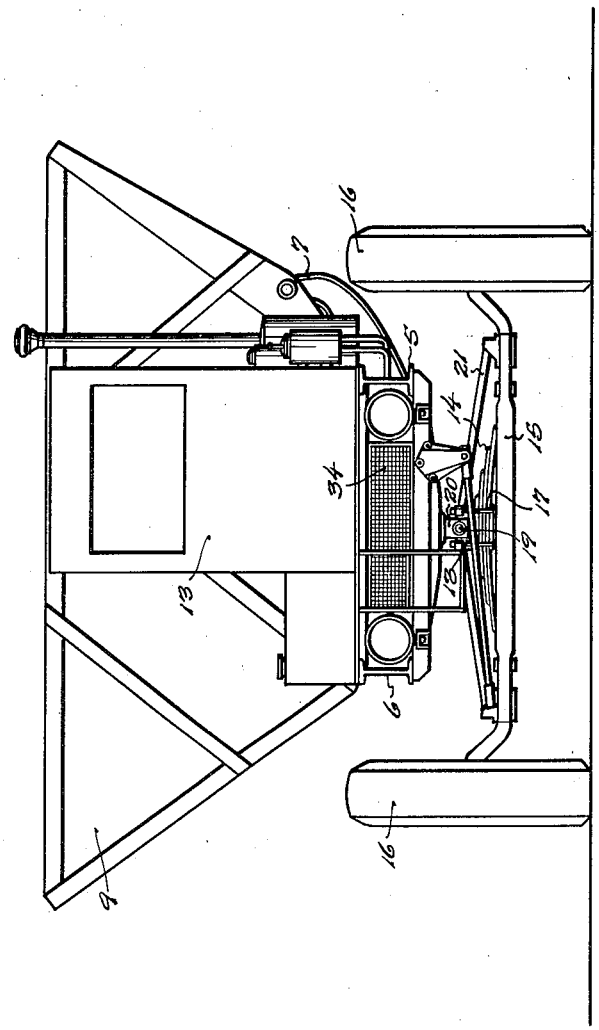
Fig. 2 is a front elevation.
Figure 3:
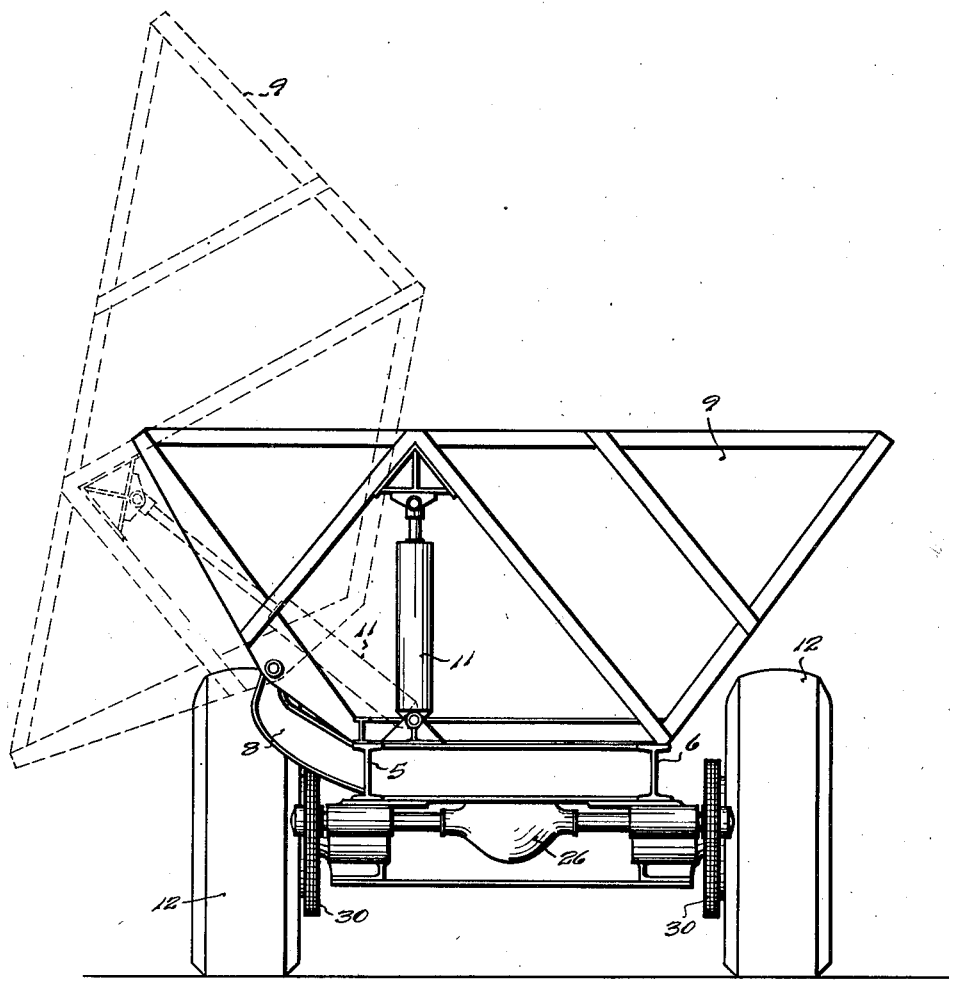
Fig. 3 is a rear elevation thereof, the latter view illustrating, by dotted lines, the position of the body in the performance of its dumping office.

Referring now by numeral to the several parts of the truck, the frame is a rigid structure consisting of the usual side channels 5—6 and their complementing transversals, and welded to this frame are rigid laterally extending out-riggers 7 and 8 which carry the dump body 9, hydraulic cylinders 10 and 11 being provided fore and aft for dumping the body. Indicated by 12 are the rear wheels, and carrying these wheels are stub axles which find a bearing in heavy castings welded to the underside of the frame channels, the dump body being positioned to locate its weight center somewhat forward of but proximate to the axial line of the rear wheels.

To the front of the dump body is the cab 13, desirably a one-man proposition built heavy to withstand the rough work, the driver's seat being flexibly mounted and this flexibility with the extreme flexure of the cross-spring 14 which carries the front axle 15, and the cushioning of the relatively soft front tires 16, permitting comfortable operation.

Said front axle is transversely channeled in its upper face—which is to say transversely of the vehicle and longitudinally as respects the axle—and riding in this channel in bearing engagement against the axle are the two ends of said front spring 14. The spring, of multiple-leaf construction, is secured at its mid-length by U-bolts 17 to a rocker-fitting 18 which is pivoted, as at 19, to a frame dependency 20 located on the longitudinal median line of the truck. Similar to the Model T Ford arrangement excepting for the center pivot, the axle is restrained by a wishbone 21 finding a universal mounting in a suitable frame dependency 22 located in spaced relation to the rear of the dependency 20.

Referring now to the mechanical parts of the truck, it will be seen that I have hung the engine 23 at a point slightly forward of the rear axles, with the clutch and transmission 24 and 25 immediately to the rear thereof, and with the differential 26 which is driven by a propeller shaft 27 being disposed rearwardly of the rear tires, the differential driving through suitably mounted jack-shafts to sprocket wheels 28 lying outside the frame channels at each side thereof. From the sprocket wheels driving chains 30 lead to the rear wheels. The chain drive, in addition to most simply effecting the general load distribution principle which characterizes my invention, is particularly advantageous where tires of extreme diameter are to be driven in that it minimizes stress on the driving parts.

Lying immediately to the front of the engine is the radiator 31 therefor, with the air-circulating fan 32 disposed in intervening relation and driven directly from the crankshaft to eliminate belts or other supplementary drive means. For shielding said motor and the radiator against dust-laden air, the same are housed in a compartment closed about the sides, top and bottom, open to the rear, and at the front end connecting with a tunnel leading from the forward limits of the truck, the tunnel being produced by boxing in the frame members top and bottom to form what constitutes a rectangular tube. A screen, as 34, is applied over the forward end of the tunnel.

I have made no effort in the drawings to show the controls for the truck inasmuch as such a disclosure adds nothing to an otherwise simple illustration of the salient features of the vehicle. It will be readily apparent that modifications may be resorted to without departing from the spirit of the invention, my intention being to limit the invention only as such limitations are necessarily brought into the hereto annexed claims to distinguish from the prior state of the art.

What I claim is:

1. In a cane truck: a vehicle frame provided with front and rear axles; wheels for said axles; a body supported by the frame in position to locate its load center in immediate proximity of the axial line of the rear wheels; and an engine and power-transmitting mechanism including a transmission and differential for driving the rear wheels, said engine, transmission and differential being mounted in line to extend from a point forwardly to a point rearwardly of the axial line of the rear wheels and centering the collective weight on a transverse line generally corresponding to the load center of the body.

2. In a cane truck: a vehicle frame provided with front and rear axles; wheels for said axles; a body supported by the frame in position to locate its load center proximate to but forwardly spaced from the axial line of the rear wheels; an engine and power-transmitting mechanism including a transmission and a differential from said engine to the rear wheels, said transmission and differential, with the engine, being massed at the rear end of the frame to have the engine lie at one side and the transmission and differential lie at the other side of the axial line of the rear wheels and by such massing centering the collective weight on a transverse line generally corresponding to the load center of the body; and a dust-shielded air tunnel leading from the forward limits of the truck to the engine.

3. In a cane truck: a vehicle frame provided with a two-point rear axle bearing, and a one-point front axle bearing; large-diameter broad wheels for the rear axle; wheels for the front axle which by comparison are narrow and of small diameter; a body supported by the frame to bring substantially its entire gross weight on the rear wheels; and an engine and means including a transmission and differential for transmitting the power of the engine to the rear wheels, said engine, transmission and differential being massed at the rear end of the frame with the total weight distributed relatively equally at the opposite sides of the axial line of the rear wheels to have approximately the same percentage of total weight applied on the driven rear wheels when empty as when loaded.

4. In a cane truck: a vehicle frame provided at its rear end with a pair of stub rear axles and, at its forward end, with a front axle; wheels for said front and rear axles; a body supported by the frame to bring substantially its entire gross weight on the rear wheels; and an engine and means including a transmission and differential for transmitting the power of the engine to the rear wheels, said engine, transmission and differential being mounted at the rear end of the frame to have the driving axes disposed approximately horizontally and with the total weight distributed relatively equally at the opposite sides of the axial line of the rear axles for applying approximately the same percentage of total weight on the driven rear wheels when empty as when loaded.

5. In a cane truck: a vehicle frame provided in forwardly spaced relation from its rear end with a pair of stub rear axles for the two rear wheels and, at its forward end, with a front axle; wheels for said front and rear axles of which the latter wheels are fitted with large-diameter broad tires and the former wheels with tires which by comparison are narrow and of small diameter; a body supported by the frame in position to locate its load center over the rear wheels; a differential located on the approximate median line of the frame at the rear end of the latter; an engine and drive connection therefrom to the differential disposed forwardly of the differential and, with the latter, centering the collective weight on a transverse line generally corresponding to the load center of the body; jackshafts driven by the differential, and sprocket wheels supported outside the frame at each side thereof on the ends of said jackshafts; and chains carried forwardly from the sprocket wheels for driving the rear wheels.

6. In a cane truck: a vehicle frame provided in forwardly spaced relation from its rear end with a pair of stub rear axles for the two rear wheels and, at its forward end, with a front axle; wheels for said front and rear axles of which the latter wheels are fitted with large-diameter broad tires and the former wheels with tires which by comparison are narrow and of small diameter; a body supported by the frame in position to locate its load center over the rear wheels; a differential located at the rear end of the frame; an engine, clutch, transmission, and propeller shaft carried in line to the front of the differential and, with the differential, centering their collective weight on the rear wheels; jackshafts driven by the differential, and sprocket wheels supported on the ends of said jackshafts; and chains carried forwardly from the sprocket wheels for driving the rear wheels.

7. In a cane truck: a vehicle frame provided in forwardly spaced relation from its rear end with a pair of stub axles for the two rear wheels and, at its forward end, with a front axle; wheels for said front and rear axles of which the latter wheels are fitted with large-diameter broad tires and the former wheels with tires which by comparison are narrow and of small diameter; frame-carried outriggers disposed fore and aft of the rear axles along one side of the truck; a body supported by the frame and having pivotal connection with the outriggers for dumping the body over one rear wheel of the truck; a differential located at the rear end of the frame, an engine, clutch, transmission, and propeller shaft carried in line to the front of the differential and, with the differential, centering their collective weight on the rear wheels of the truck; jackshafts driven by the differential, and sprocket wheels supported outside the frame at each side thereof on the ends of said jackshafts; and chains carried forwardly from the sprocket wheels for driving the rear wheels.

8. In a cane truck: in combination with front and rear axles, wheels for the axles, a vehicle body, and a liquid-cooled engine and power-transmitting mechanism from the engine to the rear wheels, said engine and power-transmitting mechanism being massed at the rear end of the truck; a radiator disposed forwardly from the engine and having connection therewith for circulation of the liquid used to cool the engine; an engine-driven fan functionally associated with the radiator; and a tunnel arranged to house the radiator and leading from the forward end of the truck with its front and rear ends open for carrying a relatively dust-free column of air past the radiator for cooling the liquid circulating therethrough from the engine.

9. A cane truck according to claim 8 characterized in that the tunnel extends rearwardly beyond and houses the engine.

10. A cane truck according to claim 8 having a frame including longitudinally extending main channels, and wherein the air tunnel at the forward end of the truck is produced by boxing in a space defined at each side by said main channels.

JOHN G. HOLMSTROM.